(12) United States Patent
Hsieh

(10) Patent No.: US 9,209,662 B2
(45) Date of Patent: Dec. 8, 2015

(54) LINEAR MOTOR

(71) Applicant: TRICORE CORPORATION, Huatan Township, Changhua County (TW)

(72) Inventor: Ping-Ju Hsieh, Huatan Township, Changhua County (TW)

(73) Assignee: TRICORE CORPORATION, Huatan Township, Changhua County (TW)

( * ) Notice: Subject to any disclaimer, the term of this patent is extended or adjusted under 35 U.S.C. 154(b) by 196 days.

(21) Appl. No.: 13/790,689

(22) Filed: Mar. 8, 2013

(65) Prior Publication Data

US 2014/0125172 A1 May 8, 2014

(30) Foreign Application Priority Data

Nov. 6, 2012 (TW) .............................. 101141220A

(51) Int. Cl.
*H02K 7/06* (2006.01)
*H02K 7/08* (2006.01)
*H02K 21/14* (2006.01)
*H02K 1/27* (2006.01)

(52) U.S. Cl.
CPC .. *H02K 7/06* (2013.01); *H02K 7/08* (2013.01); *H02K 21/145* (2013.01); *H02K 1/2733* (2013.01)

(58) Field of Classification Search
CPC .................................... H02K 7/06; H02K 7/08
USPC ............................................ 310/12.14, 80, 20
See application file for complete search history.

(56) References Cited

U.S. PATENT DOCUMENTS

| 5,994,806 | A  | * | 11/1999 | Aoki et al. ...................... 310/80 |
| 8,618,700 | B2 | * | 12/2013 | Muramatsu et al. ........ 310/12.27 |
| 2002/0043880 | A1 | * | 4/2002 | Suzuki et al. ................... 310/12 |
| 2007/0164622 | A1 | * | 7/2007 | Suzuki et al. ................... 310/80 |

\* cited by examiner

*Primary Examiner* — Hanh Nguyen
(74) *Attorney, Agent, or Firm* — Muncy, Geissler, Olds & Lowe P.C.

(57) ABSTRACT

A linear motor includes a stator module, a rotor module and an extension rod. The stator module includes a first stator unit and a second stator unit. The first stator unit includes an upper end cap including an upper holder member and an upper bobbin integrally extended from the upper holder member. The second stator unit includes a bottom end cap and a second winding. The bottom end cap includes a bottom holder member and a bottom bobbin connected to the bottom holder member and abutted against the upper bobbin. The rotor module is rotatably mounted in the stator module. The extension rod is linearly movably mounted in the stator module. The upper bobbin is integrally extended from the upper holder member. The fabrication of the linear motor is simple, ensuring a high level of precision.

11 Claims, 6 Drawing Sheets

LINEAR MOTOR

BACKGROUND OF THE INVENTION

1. Field of the Invention

The present invention relates to motor technology and more particularly, to a linear motor, which shortens the assembly time and provides a high level of precision.

2. Description of the Related Art

Normally, a linear motor has the advantages of low cost and high controllability. Therefore, linear motors are intensively used in actuators. Some linear motors use permanent magnets. These linear motors are less expensive. U.S. Pat. No. 715,133 discloses a similar linear motor, entitled "Actuator provided with grounding terminal", which, as shown in FIG. 1 of '333 patent, comprises a stator assembly (2), a rotor unit (10), an output shaft (13) and a housing (21). The rotor module (10) is rotatably mounted in the stator module (2). The output shaft (13) is linearly movable subject to rotation of the rotor module (10). The housing (21) is connected to the stator assembly (2) by a front plate (20).

In detail, the front plate (20) is welded to the stator assembly (2), and then the housing (21) positioned on the front plate (20), and then the front plate (20) is curved to secure the housing (21) in position. However, securing the housing (21) to the stator module (2) in this way complicates the manufacturing process of the linear motor. Further, when welding or curving the front plate (20), it is difficult to keep the housing (21) in position, affecting theaccuracy of the linear motor.

For this reason, any person skilled in the art should take into account all possible improvements on linear motor to overcome the foregoing problems.

SUMMARY OF THE INVENTION

The present invention has been accomplished under the circumstances in view. It is the main object of the present invention to provide a linear motor, which facilitates assembling and provide a high level of precision.

To achieve this and other objects of the present invention, a linear motor comprises a stator module, a rotor module, and an extension rod.

The stator module comprises a first stator unit and a second stator unit. The first stator unit comprises an upper end cap and a first winding. The upper end cap comprises an upper holder member, and an upper bobbin integrally extended from the upper holder member. The upper holder member comprises a top wall having a through hole. The first winding is wound round the upper bobbin. The second stator unit comprises a bottom end cap and a second winding. The bottom end cap comprises a bottom holder member, and a bottom bobbin connected to the bottom holder member and abutted against the upper bobbin. The second winding is wound round the bottom bobbin.

The rotor module is rotatably mounted in the stator module. The rotor module comprises a rotor body, and at least one magnet mounted around the rotor body. The rotor body comprises an inner thread. The magnet faces toward the first and second windings.

The extension rod is linearly movably inserted through the through hole of the top wall into the inside of the stator module, comprising an outer thread threaded onto the inner thread of the rotor body for moving the extension rod linearly upon rotation of the rotor module.

Further, the upper bobbin extends integrally from the upper holder member. Thus, no any other fixing means is necessary between the holder member and the bobbin. Therefore, the component assembly process is simplified, avoiding any positioning problem between the upper bobbin and the upper holder member, and ensuring a high level of precision of the linear motor.

Other advantages and features of the present invention will be fully understood by reference to the following specification in conjunction with the accompanying drawings, in which like reference signs denote like components of structure.

DETAILED DESCRIPTION OF THE INVENTION

Figure 1:
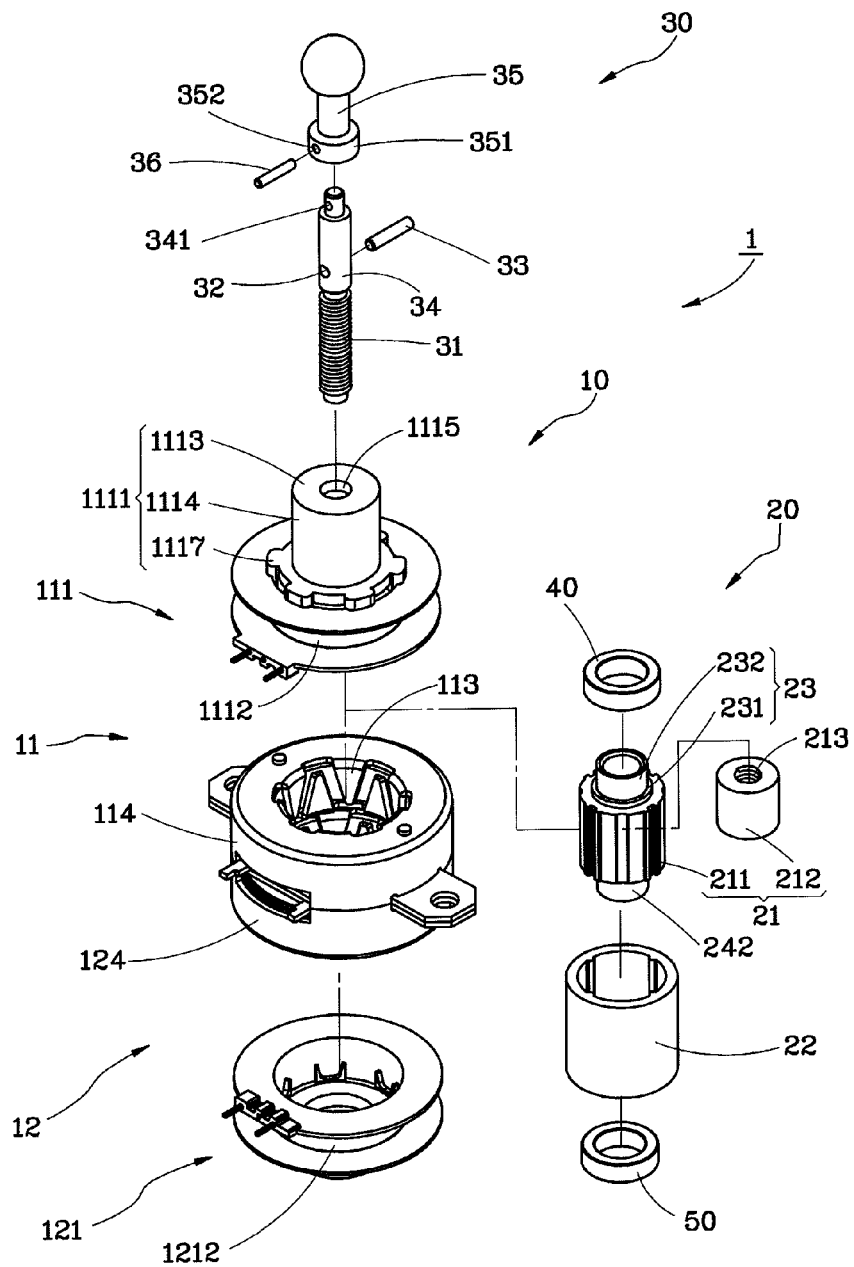
FIG. 1 is an exploded view of a linear motor in accordance with a first embodiment of the present invention.
Figure 2:
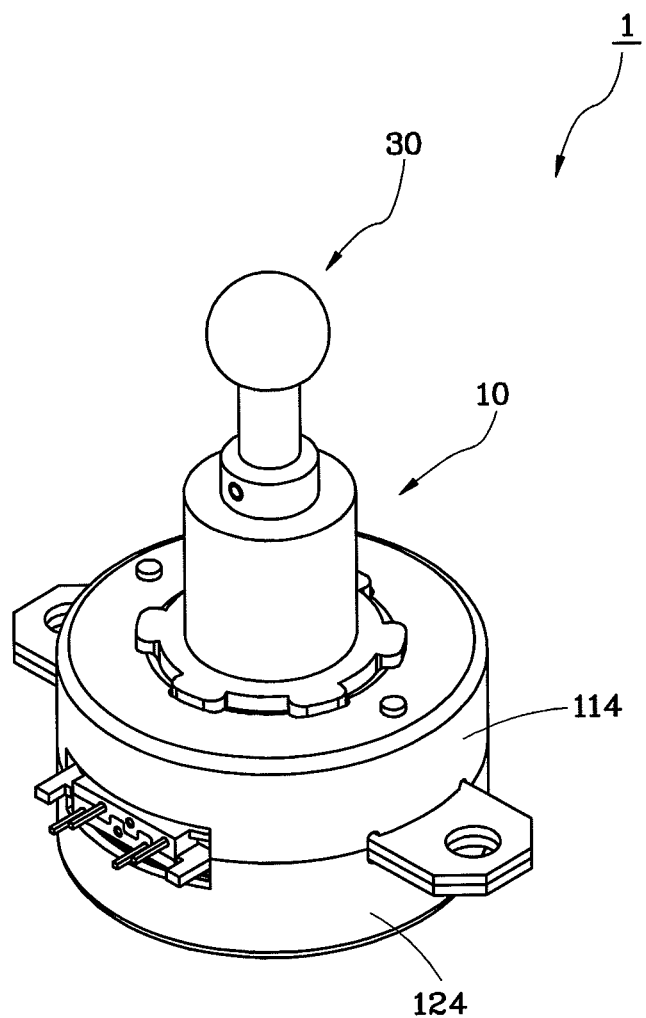
FIG. 2 is an elevational assembly view of the linear motor in accordance with the first embodiment of the present invention.
Figure 3:
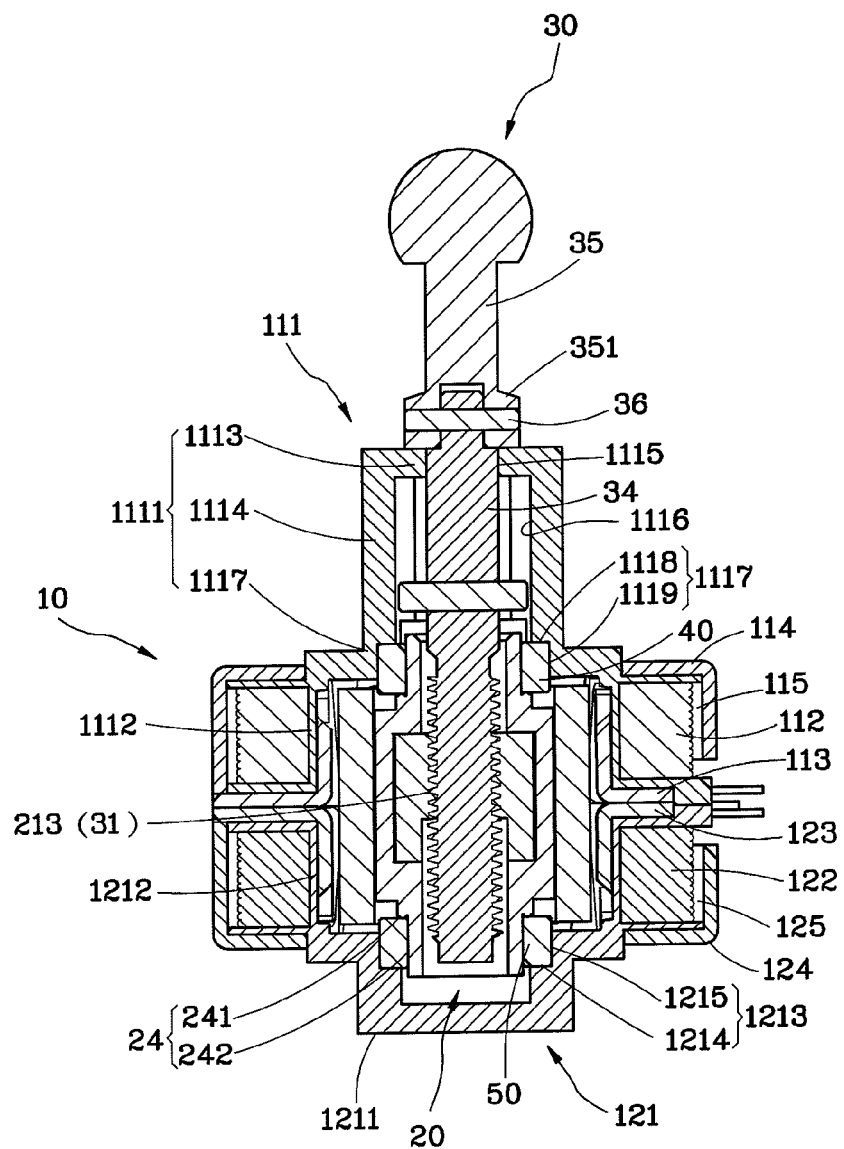
FIG. 3 is a sectional view of the first embodiment of the present invention, illustrating the extension rod in the lower limit position.

Referring to FIGS. 1 through 3, a linear motor 1 in accordance with a first embodiment of the present invention is shown. The linear motor 1 comprises a stator module 10, a rotor module 20, an extension rod 30, and two bearings 40,50.

The stator module 10 comprises a first stator unit 11, and a second stator unit 12 mounted in the first stator unit 11.

The first stator unit 11 comprises an upper end cap 111, and a first winding 112. The upper end cap 111 comprises an upper holder member 1111, and an upper bobbin 1112 extended from the upper holder member 1111 for the winding of the first winding 112. The upper holder member 1111 comprises a top wall 1113, and an annular peripheral wall 1114 connected between the top wall 1113 and the upper bobbin 1112. The top wall 1113 defines a through hole 1115 for the insertion of the extension rod 30. The annular peripheral wall 1114 defines at least one, for example, two guide grooves 1116. To facilitate positioning the bearing 40, the upper holder member 1111 defines a first bearing positioning portion 1117 between the annular peripheral wall 1114 and the upper bobbin 1112. The first bearing positioning portion 1117 defines a thrust surface 1118 and a ring surface 1119 for bearing the outer race of the bearing 40. In order to prohibit the first winding 112 from being exposed to the outside, the first stator unit 11 further comprises an inner magnetic yoke 113 and an outer magnetic yoke 114, and an accommodation chamber 115 defined between the inner magnetic yoke 113 and the outer magnetic yoke 114 for accommodating the upper bobbin 1112 and the first winding 112.

The structure of the second stator unit 12 is substantially similar to the first stator unit 11, comprising a bottom end cap 121 and a second winding 122. The bottom end cap 121 comprises a bottom holder member 1211, and a bottom bobbin 1212 extended from the bottom holder member 1211 and abutted against the upper bobbin 1112. The bottom bobbin 1212 is provided for the winding of the second winding 122. A cavity is defined between the upper holder member 111 and the bottom holder members 1211 for accommodating the rotor module 20. Similarly, for accurately positioning the bearing 50, the bottom holder member 1211 provides a third bearing positioning portion 1213 between the bottom holder member 1211 and the bottom bobbin 1212. This third bearing positioning portion 1213 defines a thrust surface 1214 and a ring surface 1215 for bearing the outer race of the bearing 50. Further, in order to prohibit the second winding 122 from being exposed to the outside, the second stator unit 12 further comprises an inner magnetic yoke 123, an outer magnetic yoke 124, and an accommodation chamber 125 defined between the inner magnetic yoke 123 and the outer magnetic yoke 124 for accommodating the bottom bobbin 1212 and the second winding 122. Making the bottom bobbin and the bottom holder member integrally in one piece ensures higher precision. However, in another embodiment of the present invention, the bottom bobbin can be a separated member connected to the bottom holder member by lock means, snap fastener, or any other fixing means.

The rotor module 20 is rotatably mounted in the stator module 10. More clearly, the rotor module 20 comprises a rotor body 21, and an annular hollow magnet 22 mounted around the rotor body 21 within the first winding 112 and the second winding 122. The rotor body 21 comprises a magnet holder 211 for holding the annular hollow magnet 22, and a nut 212 mounted inside the magnet holder 211. The nut 212 defines therein an inner thread 213. For accurately positioning the bearings 40,50, the rotor body 21 further comprises a second bearing positioning portion 23 and a fourth bearing positioning portion 24 corresponding to the first bearing positioning portion 1117 and third bearing positioning portion 1213 of the stator module 10. Further, the second and fourth bearing positioning portions 23,24 each define a thrust surface 231,241 and a ring surface 232,242 for bearing the bearings 40,50. Thus, the bearings 40,50 are respectively positioned between the first and second bearing positioning portions 1117,23 and the third and fourth bearing positioning portions 1213,24. Alternatively, multiple magnets can be arranged around the rotor body, and the rotor body can simply have the aforesaid magnet holder that has an inner thread defined thereof. Further, the amount of the bearings can also be changed.

Figure 4:
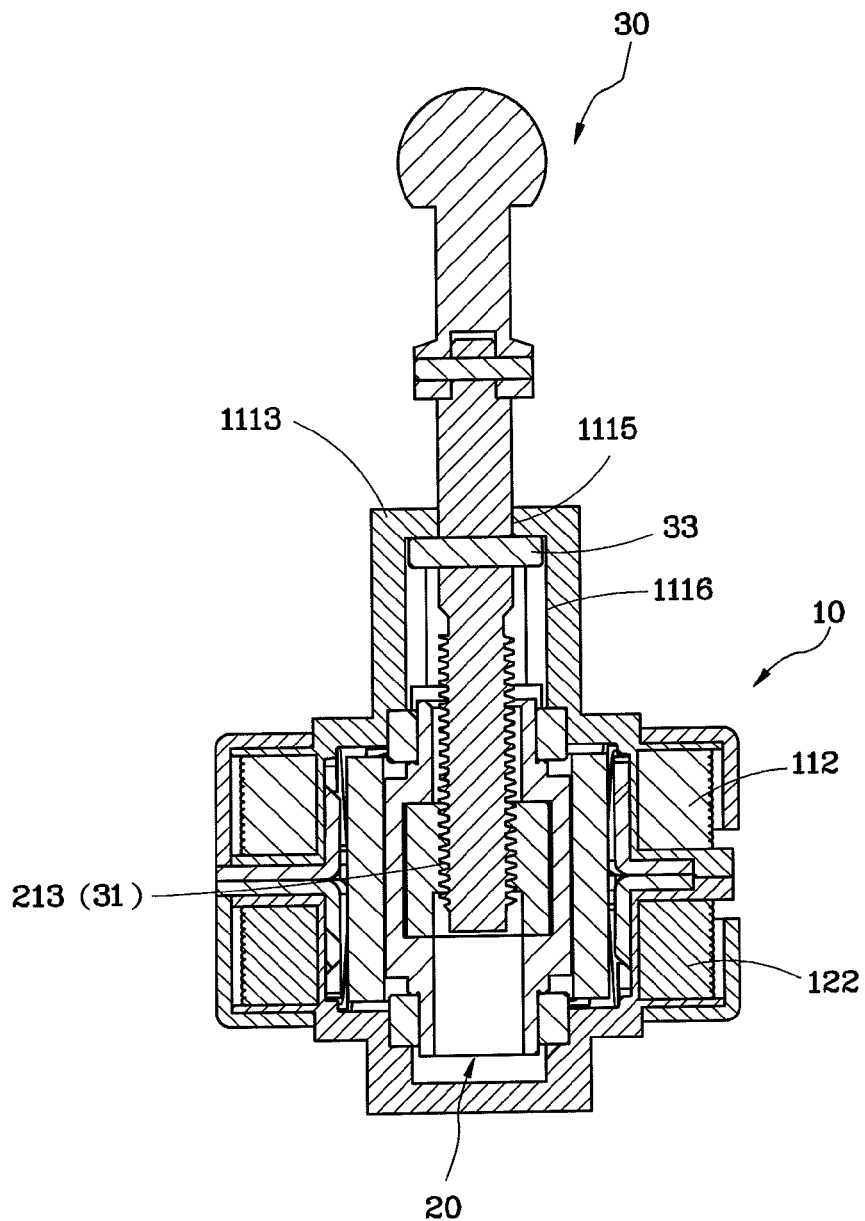
FIG. 4 is a sectional view of the first embodiment of the present invention, illustrating the extension rod in the upper limit position.

The extension rod 30 can be moved in the through hole 1115 of the top wall 1113 and inserted into the inside of the stator module 10. Further, the extension rod 30 defines an outer thread 31 that is threaded into the inner thread 213 of the rotor body 21. Thus, when the first and second windings 112,122 are electrically conducted, the rotor module 20 is rotated, driving the extension rod 30 to move linearly in the range shown in FIGS. 3 and 4. In this embodiment, the extension rod 30 comprises a pin hole 32 and a locating pin 33. The locating pin 33 is mounted in the pin hole 32, and movable in the guide grooves 1116 to prohibit the extension rod 30 from rotation during its linear motion. This arrangement to prohibit the extension rod 30 from rotation is not a limitation. Other measures can be selectively used. Further, the extension rod 30 comprises a first rod component 34 inserted into the stator module 1, a second rod component 35 exposed outside the stator module 10, and a connection pin 36. The first rod component 34 defines an outer thread 31 and a first pin hole 341. The second rod component 35 defines a first connection end 351, and a second pin hole 352 at the connection end 351 and corresponding to the first pin hole 341. The connection pin 36 is inserted into the first pin hole 341 and the second pin hole 351 to join the first and second rod components 34,35. Further, the width of the connection end 351 is larger than the diameter of the through hole 1115, preventing falling of the extension rod 30 into the inside of the stator module 10.

Figure 5:
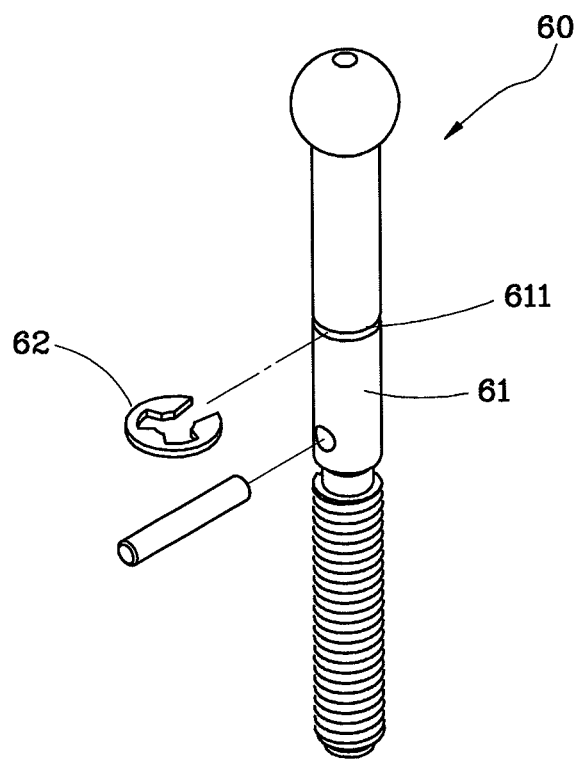
FIG. 5 is an exploded view of a linear motor in accordance with a second embodiment of the present invention.
Figure 6:
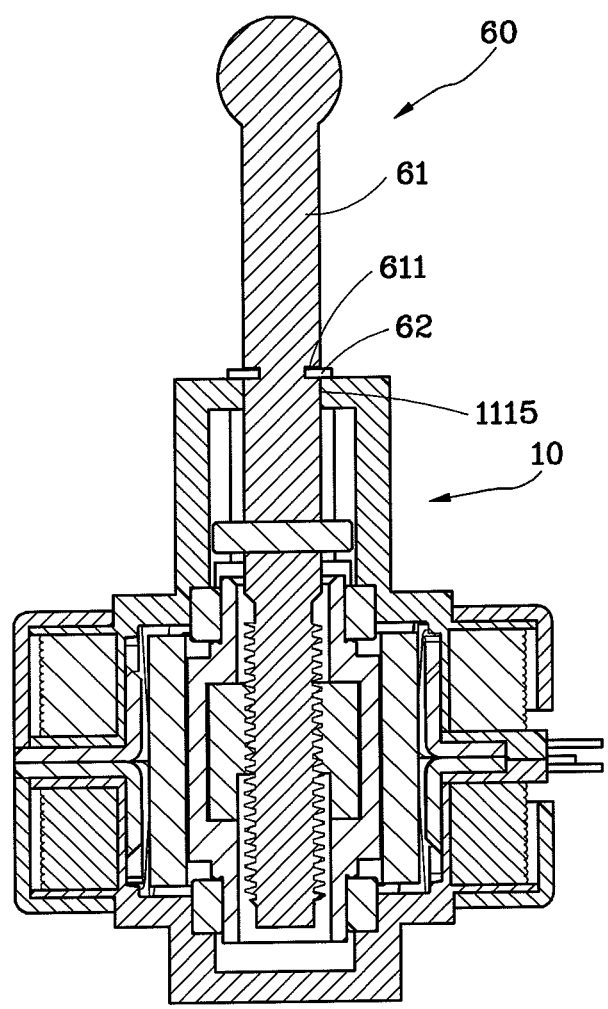
FIG. 6 is a sectional view of the linear motor in accordance with the second embodiment of the present invention.

Further, in a second embodiment of the present invention shown in FIGS. 5 and 6, the extension rod 60 comprises one single rod component 61 that has a locating groove 611 extending around the periphery and disposed outside the stator module 10, and a E-shaped retaining ring 62 mounted in the locating groove 611 and stopped outside the stator module 10. The E-shaped retaining ring 62 is larger than the diameter of the through hole 1115. Thus, the E-shaped retaining ring 62 can prevent the extension rod 60 from falling into the inside of the stator module 10.

As stated above, the first and second stator units of the linear motor in accordance with the present invention each comprise a holder member and a bobbin, i.e., no any other fixing means is necessary between the holder member and the bobbin. Thus, the component assembly process is simplified without cumulative tolerance, and the precision of the linear motor is greatly improved to meet the needs of industry.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A linear motor, comprising:
a stator module comprising a first stator unit and a second stator unit mounted in said first stator unit, said first stator unit comprising an upper end cap and a first winding, said upper end cap being monolithic and comprising an upper holder member and an upper bobbin integrally extended from said upper holder member, said upper holder member comprising a top wall, said top wall comprising a through hole, said first winding being wound round said upper bobbin, said second stator unit comprising a bottom end cap and a second winding, said bottom end cap comprising a bottom holder member and a bottom bobbin connected to said bottom holder member and abutted against said upper bobbin, said second winding being wound round said bottom bobbin,
a rotor module rotatably mounted in said stator module, said rotor module comprising a rotor body and at least one magnet mounted around said rotor body and facing toward said first winding and said second winding, said rotor body comprising an inner thread, and
an extension rod linearly movably inserted through said through hole of said top wall into the inside of said stator module, said extension rod comprising an outer thread threaded into said inner thread of said rotor body for driving said extension rod to move linearly during rotation of said rotor module.

2. The linear motor as claimed in claim 1, wherein said upper holder member comprises a first bearing positioning portion, said rotor body comprises a second bearing positioning portion, the linear motor further comprises a bearing set between said first bearing positioning portion and said second bearing positioning portion.

3. The linear motor as claimed in claim 1, wherein said bottom holder member comprises a third bearing positioning portion, said rotor body comprises a fourth bearing positioning portion, the linear motor further comprises an bearing set between said third bearing positioning portion and said fourth bearing positioning portion.

4. The linear motor as claimed in claim 1, wherein said upper holder member comprises an annular peripheral wall and at least one guide groove disposed in said annular peripheral wall, said extension rod comprises a pin hole and a locating pin inserted through said pin hole and coupled to and movable along said guide groove.

5. The linear motor as claimed in claim 1, wherein said extension rod comprises a first rod component inserted into said stator module, said first rod component carrying said outer thread and comprising a first pin hole, a second rod component exposed outside said stator module, said second rod component comprising a second pin hole, and a connection pin inserted into said first pin hole and said second pin hole to join said first rod component and said second rod component.

6. The linear motor as claimed in claim 5, wherein said second rod component comprises a connection end carrying said second pin hole, said connection end having a transverse width larger than the diameter of the through hole of said top wall.

7. The linear motor as claimed in claim 1, wherein said extension rod comprises a locating groove extending around the periphery thereof and disposed outside said stator module, and a retaining ring mounted in said locating groove and stoppable outside said stator module.

8. The linear motor as claimed in claim 1, wherein said first stator unit further comprises outer magnetic yoke, an inner magnetic yoke, and an accommodation chamber defined between the outer magnetic yoke and inner magnetic yoke of said first stator unit for accommodating said upper bobbin and said first winding.

9. The linear motor as claimed in claim 1, wherein said second stator unit further comprises an outer magnetic yoke, an inner magnetic yoke, and an accommodation chamber defined between the outer magnetic yoke and inner magnetic yoke of said second stator unit for accommodating said bottom bobbin and said second winding.

10. The linear motor as claimed in claim 1, wherein said rotor body comprises a magnet holder holding said magnet therearound, and a nut mounted in said magnet holder and defining said inner thread therein.

11. The linear motor as claimed in claim 1, wherein said bottom cap is monolithic and said bottom bobbin extends integrally from said bottom holder member.

* * * * *